United States Patent
Tanner

(10) Patent No.: US 10,287,456 B2
(45) Date of Patent: May 14, 2019

(54) NATURAL OIL DERIVED GELLED INK VEHICLES

(71) Applicant: Ethox Chemicals, LLC, Greenville, SC (US)

(72) Inventor: James T. Tanner, Greenville, SC (US)

(73) Assignee: Ethox Chemicals, LLC, Greenville, SC (US)

( * ) Notice: Subject to any disclaimer, the term of this patent is extended or adjusted under 35 U.S.C. 154(b) by 0 days.

(21) Appl. No.: 16/036,073

(22) Filed: Jul. 16, 2018

(65) Prior Publication Data

US 2018/0334590 A1 Nov. 22, 2018

Related U.S. Application Data

(62) Division of application No. 13/776,681, filed on Feb. 25, 2013.

(60) Provisional application No. 61/603,251, filed on Feb. 25, 2012.

(51) Int. Cl.
*C09D 191/00* (2006.01)

(52) U.S. Cl.
CPC .................. *C09D 191/00* (2013.01)

(58) Field of Classification Search
CPC ..................................... C09D 191/00
USPC ........................................... 560/196
See application file for complete search history.

(56) References Cited

U.S. PATENT DOCUMENTS

| | | | |
|---|---|---|---|
| 2014/0230689 A1* | 8/2014 | Houser | C09D 11/02 106/31.13 |
| 2014/0243550 A1* | 8/2014 | Tanner | C09D 191/00 560/196 |

* cited by examiner

*Primary Examiner* — Yong L Chu
(74) *Attorney, Agent, or Firm* — Joseph T. Guy; Patent Filing Specialist, Inc.

(57) ABSTRACT

Novel natural oil derived ink vehicles are provided by a two step process that does not require the addition of gelants or the irreversible heat bodying or polymerization of the oil. The gelled natural oil may be used as the vehicle/carrier in the ink formulation or alternatively used as a carrier or dispersant for additives in ink formulations. The gelled ink vehicles disclosed have many advantages over ink vehicles disclosed in the prior art.

8 Claims, 3 Drawing Sheets

10 Percent Maleated Soybean Oil
Viscosity Versus Percent Neutralization

NATURAL OIL DERIVED GELLED INK VEHICLES

This application is a divisional application of pending U.S. patent application Ser. No. 13/776,681 filed Feb. 25, 2013 which, in turn, claims the priority benefit under 35 U.S.C. section 119 of U.S. Provisional Patent Application No. 61/603,251 entitled "Natural Oil Derived Gelled Ink Vehicles" filed Feb. 25, 2012, both of which are entirety herein incorporated by reference.

BACKGROUND OF THE INVENTION

The primary component of lithographic printing inks is a gelatinous or gelled vehicle or carrier that must possess sufficient viscosity to disperse finely divided pigments, anti-abrasion additives, and other solid components. Historically, the vehicle or carrier has been based on hydrocarbon based resins, and the control of the rheology of the ink vehicle has historically been challenging. In order to achieve the required gel structure, gelants must be added to the resin. Typical gelants are the aluminum acylates or alkoxides as described in U.S. Pat. No. 5,427,615 and modified clays as described in U.S. Pat. No. 4,193,806. Other molecular gelants such as polyamide resins and styrene-butadiene block copolymers have been used as gelants in hydrocarbon based oils and solvents. There are several undesirable aspects associated with the use of these gelants.

Organoaluminum based gelants are typically provided in solvents at low concentration of the active aluminum component thus increasing the percentage of VOC's in the formulation. Heat is required for gelation to occur and precise temperature control is required or the gel structure can be destroyed. The modified clays also require heat and sometimes high shear is required to activate or open the clay structure in order for gelation to occur. Polyamide and block copolymer based gelants must be used at high weight percent loadings, typically 20 percent or higher, in order to achieved the desired viscosity. In addition all of these gelants add substantially to the cost of the ink vehicle.

There has been considerable interest in developing vehicles or carriers for oil-based printing inks that do not require petroleum or hydrocarbon based components. Decreasing supplies of petroleum, environmental concerns, and interest in biodegradable and renewable resources have prompted the ink manufacturers to initiate efforts to develop inks with vehicles based on biodegradable materials to reduce the industry's dependency on petroleum. 1) ("Vegetable-Oil-Based Printing Ink Formulation and Degradation". Erhan, S. Z, Bagby, M. O. Industrial Crops and Products. 3 (1995). 237-246. 2) "Vegetable Oil-Based Printing Inks". Erhan, S. Z, Bagby, M. O. JAOCS, Vol. 69, no. 3 (1992) 251.

The primary means for increasing the viscosity or gelation of natural oils has historically been referred to as "heat-bodying" the oil. In this process, unsaturated natural oils are subjected to high temperatures, typically 300-340 deg C. in an inert atmosphere in order to promote chemical crosslinking at the sites of unsaturation in the triglyceride oil. This process as described in U.S. Pat. Nos. 5,122,188 and 6,418,852 typically results in oils with viscosities in the range 1600-1800 centipoise. In order to obtain higher viscosities, a second type of heat-bodying process is employed in which the high temperature heating is continued until the oil is irreversibly gelled. This intractable gel is then heated at about 340 deg C. with unmodified oil to produce the desired viscosity. It is often necessary to filter insoluble clumps of gelled oil from these blends. In addition, because both of these processes result in irreversible chemical crosslinks between the triglyceride oil chains; it is difficult to maintain obtain precise control of the viscosity. Both of these processes also require rigorous exclusion of oxygen in order to prevent oil degradation and discoloration.

The present invention discloses gelled natural oils useful as ink vehicles and a novel method for their production. The natural oil gelled ink vehicles of the present invention offer several advantages over gelled vehicles disclosed in prior art in that no gelants are required and "heat-bodying" of the oil is unnecessary. The viscosities of the natural oil gelled ink vehicles may also be precisely controlled.

OBJECTS OF THE PRESENT INVENTION

It is an object of the present invention to provide biodegradable natural oil derived gelled vehicle/carrier compositions that can be incorporated into ink and coating formulations.

Another object of the present invention is to provide biodegradable natural oil derived gelled vehicle/carrier compositions that are derived from a renewable resource in place of non-renewable petroleum based compositions.

A further object of the present invention is to provide biodegradable natural oil derived gelled vehicle/carrier compositions that do not require the addition of gelants in order to achieve desired viscosities.

An additional object of the present invention is to provide biodegradable natural oil derived gelled vehicle/carrier compositions that do not require high temperature "heat-bodying" of the oil.

A still further object of the present invention is to provide biodegradable natural oil derived gelled compositions useful as vehicles for additives in ink formulations.

SUMMARY OF THE INVENTION

Figure 1:
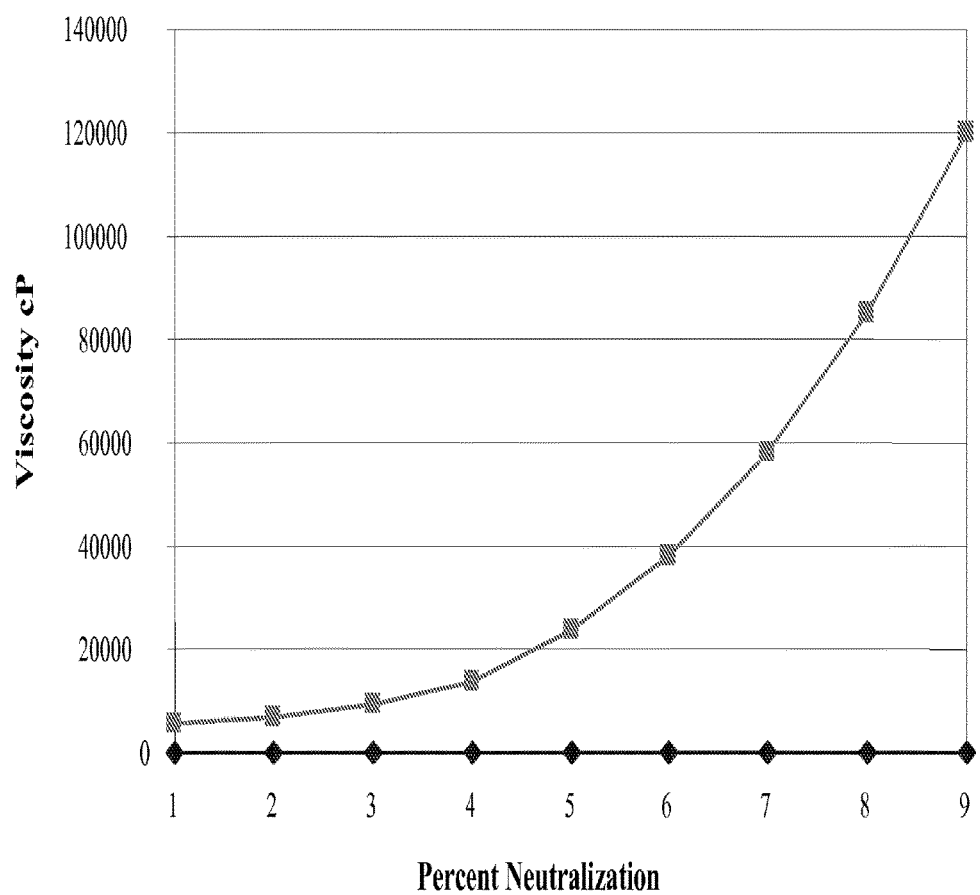
FIG. 1 shows that the viscosity may be controlled by the amount of neutralization of the maleic anhydride moieties.

The instant invention provides a gelled printing vehicle for heatset or other lithographic printing comprising an adduct derived from the reaction product of a natural unsaturated triglyceride oil, or derivative with a substrate suitable for Diels Alder reaction or Ene reaction and wherein said adduct is reacted in a non-aqueous neutralization reaction with a suitable base to form an ionomeric anhydrous gel.

The invention also relates to a gelled printing vehicle for heatset or other lithographic printing comprising an adduct derived from the reaction product of an unsaturated triglyceride oil, or derivative with a substrate suitable for Diels Alder reaction or Ene reaction; said adduct being reacted in a non-aqueous neutralization/esterification reaction with an alkanolamine to form an ionomeric anhydrous gel.

DETAILED DESCRIPTION OF THE PRESENT INVENTION

The present invention provides gelled vehicles for non-aqueous ink formulations that are derived from natural oils.

Thermoreversible gels of unsaturated natural oils of any desired viscosity are conveniently obtained by a simple economical two step process. This process has been described in detail in Applicant's U.S. co-pending application Ser. No. 13/776,542 filed Feb. 25, 2013; the entire contents of which are incorporated by reference herein and will be summarized here.

In the first step, the unsaturated natural oil, fatty acid or derivative thereof is modified by a process in which the double bonds and/or conjugated double bonds of the triglyceride oil chains are reacted via thermal condensation with an unsaturated substrate which is capable of undergoing an "ene" reaction or an Diels Alder reaction with the sites of unsaturation resulting in the formation of an adduct of the triglyceride oil. The adduct formed is preferentially an anhydride and the substrate reacted in this manner with the triglyceride oil is preferably maleic anhydride. The term "maleation" been historically applied to the reaction of natural unsaturated oils, fatty acids and their derivatives. Functionaliztion of triglyceride oils by this method is well known in the art and is described in U.S. Pat. Nos. 2,033,131, 2,033,132 and 2,063,540. These adducts are generally referred to in the literature as "maleated oils" or maleinized oils". The aqueous neutralization of these natural oil adducts is also well known in the art to produce soaps, emulsifiers and water-based lubricants.

The method described in co-pending application Ser. No. 13/776,542 (incorporated by reference) in its entirety involves the controlled non-aqueous neutralization of such adducts to provide thermoreversible ionomeric gels. As described in co-pending application Ser. No. 13/776,542 either an alkali or alkaline earth metal base may be employed as the neutralization agent or an alkanolamine may be employed as a neutralization/esterification agent to produce the gels.

This method has proven to be applicable to a wide range of natural unsaturated oils and their derivatives and allows thermoreversible gels of any desired viscosity, from viscous liquids to hard solid gels, to be produced. As described the method has many advantages over the prior art in that the gels are conveniently and economically produced and do not require the addition of expensive gelants or require the thermal "heat bodying" of the oil. The natural oils that may be used in the method of the present invention include any triglyceride oil that contains significant portions of unsaturated fatty acids. Natural triglyceride oils containing both non-conjugated and conjugated double bonds are suitable. Non-limiting examples of suitable triglyceride oils include soybean oil, linseed oil, safflower oil, sunflower oil, rapeseed oil, castor oil, tall oil, rosin oil and tung oil.

Examples 1-10

The following examples are intended to illustrate particularly exemplary Natural Oil Gels of the present invention and should not be construed to limit its scope or applicability in any way.

The following general method was used to prepare the Natural Oil Gels listed in Table 1. In a first step, 2000 g of the natural oil and the desired amount of maleic anhydride were charged to a 3 L four-neck round-bottom flask. The contents of the flask were gradually heated to 210° C. with agitation under a nitrogen sparge. The reaction mixture was held at this temperature until no free maleic anhydride was detected in the reaction mixture by GC analysis. The reaction mixture was cooled to 50° C. and an amount of Sodium Carbonate (0.25 eq. per eq. maleic anhydride) was slowly added. The Sodium Carbonate could be added as a solid or as a water slurry. The reaction mixture was held at 60° C. until all of the Sodium Carbonate had reacted and the reaction mixture had cleared. Excess water was stripped out under vacuum and the gel obtained was discharged. The gels obtained had exemplary properties, being clear and transparent and exhibited no oil bleed.

TABLE 1

Properties of Gelled Natural Oils

| Example | Percent Maleic Anhydride | Clarity | Oil Bleed | Viscosity (cP) |
|---|---|---|---|---|
| 1) Soybean Oil | 7.5 | Transparent | None | 1000 |
| 2) Soybean Oil | 8 | Transparent | None | 8000 |
| 3) Soybean Oil | 9 | Transparent | None | 15000 |
| 4) Soybean Oil | 10 | Transparent | None | 20000 |
| 5) Soybean Oil | 11 | Transparent | None | Soft Gel (Slight Tack) |
| 6) Soybean Oil | 12 | Transparent | None | Hard Gel (No tack) |
| 6) Linseed Oil | 7.5 | Transparent | None | 5000 |
| 7) Linseed Oil | 8 | Transparent | None | 12000 |
| 8) Linseed Oil | 9 | Transparent | None | 20000 |
| 9) Linseed Oil | 10 | Transparent | None | 80000 |
| 10) Linseed Oil | 12 | Transparent | None | Hard Gel (No tack) |

The viscosity of the gels in Examples 1-10 was controlled by the amount of maleic anhydride grafted on the fatty acid chains of the oil. Alternatively, the viscosity may also be controlled by the amount of neutralization of the maleic anhydride moieties as shown in FIG. 1.

Examples 10-20

The following general method was used to prepare the natural oil gels listed in Table 2. In a first step, 2000 g of the natural oil and the desired amount of maleic anhydride were charged to a 3 L four-neck round-bottom flask. The contents of the flask were gradually heated to 210° C. with agitation under a nitrogen sparge. The reaction mixture was held at this temperature until no free maleic anhydride was detected in the reaction mixture by GC analysis. The reaction mixture was cooled to 50° C. and triethanolamine or an alkoxylated triethanolamine (0.67 eq. per 1.0 eq. maleic anhydride) was slowly added. The reaction mixture was held at 80° C. for 1 hour or until no unreacted maleic anhydride was observed in the Infrared Spectrum of the reaction mixture and the gel obtained was discharged.

TABLE 2

Properties of Gelled Natural Oils

| Example | Percent Maleic Anhydride | Clarity | Oil Bleed | Viscosity (cP) |
|---|---|---|---|---|
| 11) Soybean Oil | 7.5 | Transparent | None | 4500 |
| 12) Soybean Oil | 8 | Transparent | None | 8700 |
| 13) Soybean Oil | 9 | Transparent | None | 21000 |
| 14) Soybean Oil | 10 | Transparent | None | 46000 |
| 15) Soybean Oil | 11 | Transparent | None | Soft Gel (Slight Tack) |
| 16) Soybean Oil | 12 | Transparent | None | Hard Gel (No tack) |
| 17) Linseed Oil | 7.5 | Transparent | None | 6200 |
| 18) Linseed Oil | 8 | Transparent | None | 9500 |
| 19) Linseed Oil | 9 | Transparent | None | 23000 |
| 20) Linseed Oil | 10 | Transparent | None | Soft Gel (Slight Tack) |
| 21) Linseed Oil | 12 | Transparent | None | Hard Gel (No tack) |

Example 22

Figure 2:
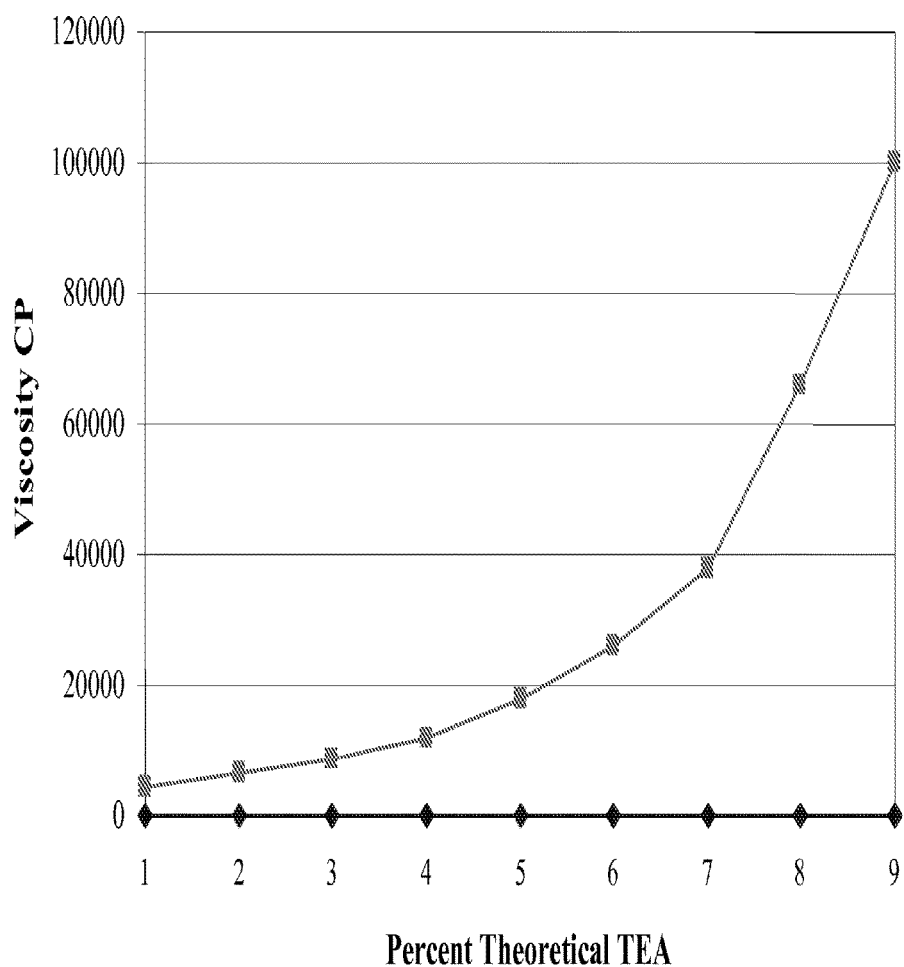
FIG. 2 shows the precise viscosity control of the vehicle that can be achieved by varying the percentage of the theoretical stoichiometric amount of triethanolamine added.

FIG. 2 shows the precise viscosity control of the vehicle that can be achieved by varying the percentage of the theoretical stoichiometric amount of triethanolamine added. A soybean oil/maleic anhydride adduct at 10.0 percent maleation was prepared as in examples 11-21. Triethanolamine was added from 20 percent to 70 percent of the theoretical stoichiometric amount required to react with all of the maleic anhydride moieties. The gels were discharged and viscosities were measured at 25 deg C. Above 70 percent theoretical Triethanolamine, hard gels were obtained.

Example 23

Biodegradable Natural Oil Based Gelled Ink Vehicle

Soybean oil gels of different viscosities as prepared in examples 1-10 and examples 11-21 were utilized as a carrier for the preparation of polytetrafluorethylene dispersions. Such dispersions are known in the art to be useful as additives in non-aqueous ink formulations to provide friction reduction and abrasion resistance to the final prints. The dispersions were prepared by mixing micronized PTFE into the gelled soybean oil at 80° C. for 1 hour, allowing the mixtures to cool and then discharging. Dispersions were prepared at 25% and 75% PTFE loading. Control dispersions were made using a standard soy based alkyd resin. The dispersions were then aged at 50° C. in order to evaluate dispersion stability. The additives based on the soybean oil gels and the control alkyd were then formulated into a pigmented ink and prints were prepared. The prints were dried and then subjected to abrasion resistance testing. The results are shown in Table 3.

TABLE 3

| Vehicle/Viscosity (cP) | Percent PTFE | Dispersion Stability$^c$ | Print Rub Resistance$^d$ |
|---|---|---|---|
| 24) Soybean Oil Gel (9000 cP) | 25 | 7 | 6 |
| 25) Soybean Oil Gel (9000 cP) | 75 | 6 | 6 |
| 26) Soybean Oil Gel (15000 cP) | 25 | 8 | 8 |
| 27) Soybean Oil Gel (15000 cP) | 75 | 7 | 9 |
| 28) Soybean Oil Gel (20000 cP) | 25 | 10 | 10 |
| 29) Soybean Oil Gel (20000 cP) | 75 | 8 | 10 |
| 30) Soy based Alkyd (9000 cP) | 25 | 4 | 4 |
| 31) Soy based Alkyd (9000 cP) | 75 | 4 | 4 |

$^c$Dispersion Stability was evaluated by ageing samples at 50 deg C. for 72 hours and monitoring the amount of PTFE that had settled. The dispersions were rated on a scale from 1-10. 1 being the worst stability and 10 the best.
$^d$The rub resistance of the prints was rated on a scale from 1-10 with 1 being the worst rub resistance and 10 the best.

Example 32

Clay Dispersions

Figure 3:
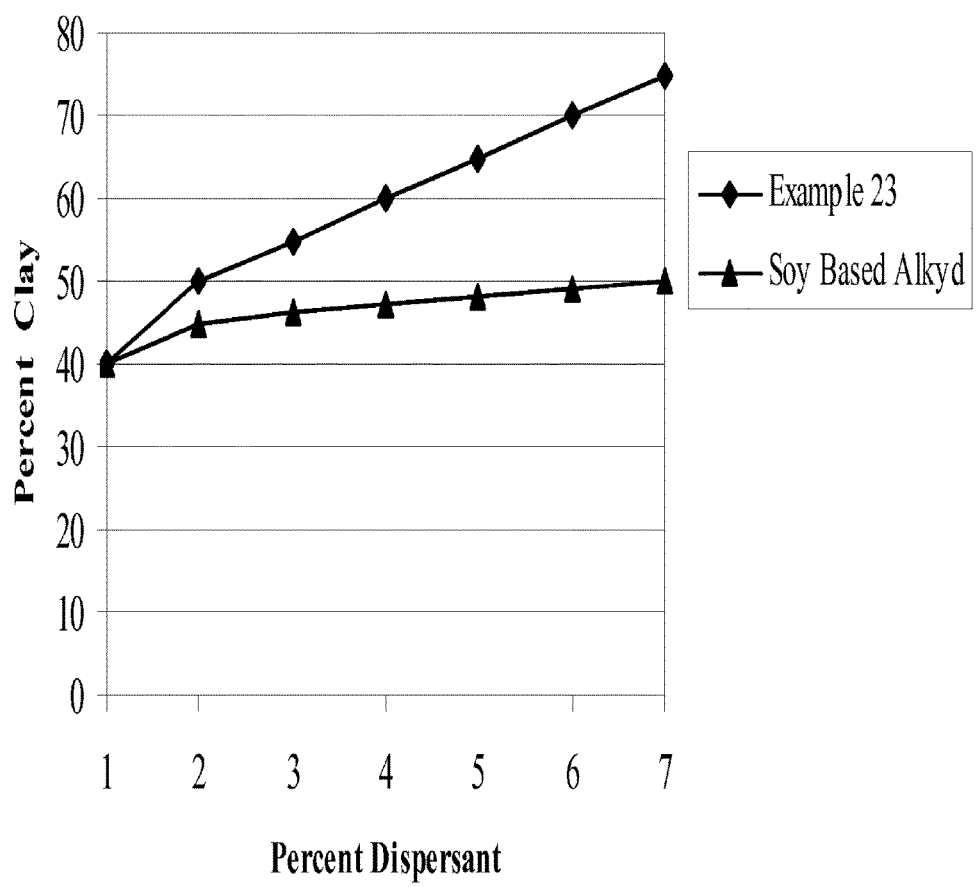
FIG. 3 illustrates clay loadings of up to 75 percent achieved with a soybean oil gel of Example 11 while loadings of only 50 percent were achieved with the standard soy based alkyd resin.

A soybean oil gel as prepared in Example 11 having a viscosity of 4500 cP was utilized as a carrier or dispersant for the preparation of stable dispersions of bentonite clay in soybean oil which are utilized as fillers in heat set inks A soy based alkyd resin, commonly used in the industry, was used as a control or comparative example. As shown in FIG. 3, clay loadings of up to 75 percent were achieved with a soybean oil gel of Example 11 while loadings of only 50 percent were achieved with the standard soy based alkyd resin.

The content of all references cited in the instant specifications and all cited references in each of those references are incorporated in their entirety by reference herein as if those references were denoted in the text.

While the many embodiments of the invention have been disclosed above and include presently preferred embodiments, many other embodiments and variations are possible within the scope of the present disclosure and in the appended claims that follow. Accordingly, the details of the preferred embodiments and examples provided are not to be construed as limiting. It is to be understood that the terms used herein are merely descriptive rather than limiting and that various changes, numerous equivalents may be made without departing from the spirit or scope of the claimed invention.

What is claimed is:

1. A gelled printing vehicle for heatset or other lithographic printing comprising an adduct derived from the reaction product of a natural unsaturated triglyceride oil, or derivative with a substrate suitable for Diels Alder reaction or Ene reaction; said adduct being reacted in a non-aqueous neutralization/esterification reaction with an alkanolamine to form an ionomeric anhydrous gel.

2. The gelled printing vehicles of claim 1, useful as carriers or vehicles for additives in non-aqueous ink formulations.

3. The gelled printing vehicles of claim 1, useful as dispersants for additives in non-aqueous formulations.

4. A gelled printing vehicle for heatset or other lithographic printing comprising an adduct derived from the reaction product of a natural unsaturated triglyceride oil, or derivative with a substrate suitable for Diels Alder reaction or Ene reaction said adduct being reacted with an alkanolamine to form an ionomeric anhydrous gel.

5. The gelled printing vehicles of claim 4, useful as carriers or vehicles for additives in non-aqueous ink formulations.

6. The gelled printing vehicles of claim 4, useful as dispersants for additives in non-aqueous formulations.

7. A gelled printing vehicle for heatset or other lithographic printing comprising an ionomeric anhydrous gel adduct derived from the reaction of an alkanolamine with a reaction product of a natural unsaturated triglyceride oil, or derivative with a substrate suitable for Diels Alder reaction or Ene reaction.

8. The gelled printing vehicle for heatset or other lithographic printing of claim 7 wherein said reaction with said alkanolamine is a non-aqueous neutralization/esterification reaction.

* * * * *